United States Patent [19]

Fassbender

[11] 4,009,490
[45] Feb. 22, 1977

[54] PLO PHASE DETECTOR AND CORRECTOR

[75] Inventor: Charles J. Fassbender, San Diego, Calif.

[73] Assignee: NCR Corporation, Dayton, Ohio

[22] Filed: July 7, 1975

[21] Appl. No.: 594,144

[52] U.S. Cl. .................................. 360/45; 360/51
[51] Int. Cl.² .......................................... G11B 5/09
[58] Field of Search .................. 360/40, 45, 51

[56] References Cited

UNITED STATES PATENTS

| | | | |
|---|---|---|---|
| 3,641,534 | 2/1972 | Irwin | 360/51 |
| 3,864,735 | 2/1975 | Deris et al. | 360/51 |
| 3,938,184 | 2/1976 | Defrancesco | 360/51 |

Primary Examiner—Vincent P. Canney
Attorney, Agent, or Firm—J. T. Cavender; James H. Phillips

[57] ABSTRACT

Apparatus in a high-density disk storage controller for qualitatively testing circuits recovering self-clocking data, on-line and independently of any storage device. The ability of the data recovery apparatus, which is designed with broad-tolerance circuits and components, to recover a data pattern having predetermined and worst-case phase-shift or jitter is tested dynamically under microprocessor control. The test results are evaluated and apparatus in the data recovery circuits selectively positions a read strobe precisely in the center of the data window to compensate for variations of delay encountered in different combinations of the broad-parameter components.

13 Claims, 7 Drawing Figures

PLO PHASE DETECTOR AND CORRECTOR

CROSS REFERENCE

The present invention relates to my copending United States Patent Application Ser. No. 594,145, entitled "Test Code Generator" which was filed on even date herewith and is assigned to the same assignee as the present invention.

BACKGROUND OF THE INVENTION

1. Field of the Invention

This invention relates to information storage and retrieval, and more particularly, to apparatus in a cyclic store control unit for dynamically testing the control unit circuits at a device interface and automatically compensating for accumulative signal propagation delays.

Typical bulk memory subsystems having direct access storage devices such as magnetic disks include a computer driven controller, a disk drive system, a plurality of magnetic recording disks, and speed detection apparatus which may comprise a disk surface having servo timing marks recorded thereon. Other forms of speed detection apparatus such as a digital tachometer may be utilized. The timing marks are sensed and utilized to drive a clock signal generator into synchronization with the sensed timing marks to produce a series of clock signals. The servo derived clock signals are utilized in the store controller for write operations wherein the clock signals may be combined with data to be stored and recorded on one of the magnetic disks as a series of indicia or flux transitions representative of both the clock signals and the data. Data thus recorded with timing inherent therein is termed self-clocking data. The present invention is concerned with circuits for recovering self-clocking data.

During a read or data recovery operation the servo signals from the storage device are ignored and the clock signal generator is synchronized directly with the self-clocking data, which is sensed by a magnetic transducer from a selected storage device.

2. Description of the Prior Art

Many self-clocking modulation and coding techniques are used to improve the efficiency of magnetic-medium devices and to minimize the problems attendant with extremely high bit densities. One such technique is termed modified frequency modulation (MFM). The use of MFM coding derives advantages over other types of codes such as diphase or phase encoding because the MFM code results in fewer flux transitions to represent the same data pattern. Recovered MFM encoded data exhibits an inherent phenomenon called random peak shift (in addition to a predictable peak shift) wherein the recovered data shifts in time by random amounts and direction. Mechanical and electronic design tolerances are critical at high bit densities; minute anomalies such as slight variations in speed of the magnetic medium, asymmetric read-head windings and non-uniform write-current waveform rise times, all contribute to the randomness of the peak shift or jitter. Accordingly, the prior art systems for recovering MFM encoded data required complex circuits with precision components to detect and correct the random peak shift, thereby reducing or eliminating the advantages gained.

Circuits for recovering self-clocking data are designed largely with commercially available integrated circuit modules such as the well known dual-in-line package (DIP). The modules contain circuits and logic elements having variable signal propagation delays, i.e., each delay through each circuit, although within guaranteed maxima and minima, may vary from circuit to circuit and from module to module. Accordingly, it has been the practice in the past to test and select specific modules for individual timing accuracy so that a number of interconnected modules will have more closely predictable signal propagation times. This is an expensive and time consuming procedure. Other prior art data recovery circuits utilize less precise modules with manually adjustable components for compensating for variations in signal propagation time. This technique requires removing the equipment from service periodically for testing and readjustment of the data recovery circuits by a service technician, utilizing a test data string recorded on a magnetic disk. In order to test the ability of data recovery circuits to compensate for random jitter without introducing additional error into the data stream, it is necessary to provide a test data string having no jitter or a known amount of jitter. Such test data strings have been provided in the past from special disks recorded with a high degree of precision. For example, the test data string recorded on the special disk may have a pattern of bits bearing a timed relationship to an ideal bit pattern wherein certain of the bits appear early or late by a known amount in relation to the ideal pattern. Such test disks are expensive to produce, and moreover, the method is device dependent, failing to eliminate errors which might be introduced by the disk drive.

SUMMARY OF THE INVENTION

It is, therefore, a primary object of my invention to provide new and improved apparatus for testing circuits recovering self-clocking data.

Another object of the invention is to provide new and improved apparatus in a cyclic store control unit for testing the control unit circuits at a device interface, which apparatus is storage-device independent.

It is another object of my invention to provide new and improved apparatus for testing a circuit comprising interconnected standard logic-element modules, without regard to individual gate delays of the interconnected modules.

Still another object of the invention is to provide apparatus for dynamically testing and adjusting the data recovery circuits of a cyclic store control unit.

A more specific object of the invention is to provide a means for reducing the amount of input-signal offset caused by gate delay variations of interconnected circuit modules forming the data recovery circuits.

These and other objects of my invention are achieved in accordance with one aspect thereof by providing a test code generator in a control unit of a cyclic store subsystem driven by a timing means independent of direct access storage devices. The test code generator produces a bit string of MFM encoded data free of random jitter. A predetermined amount of jitter may be introduced into the bit string by delaying selected ones of the bits thereof in a delaying means. A phase-locked oscillator derives a clock signal from the input data and a data framing signal is generated therefrom. Data detection circuits receive a test data signal from a delaying means having a plurality of selectable outputs. The test data signal is selectively delayed to define the bounds of proper operation within the time period of the data framing signal, thereby detecting the offset inherent in the data detection circuits. An output of the delaying means which positions the data signal nearest the center of the data framing signal is then selected for normal operation.

BRIEF DESCRIPTION OF THE DRAWINGS

The invention is pointed out with particularity in the appended claims, however, other features of the invention will become more apparent and the invention will be best understood by referring to the following detailed description in conjunction with the accompanying drawings in which:

DESCRIPTION OF THE PREFERRED EMBODIMENT

Figure 1A:
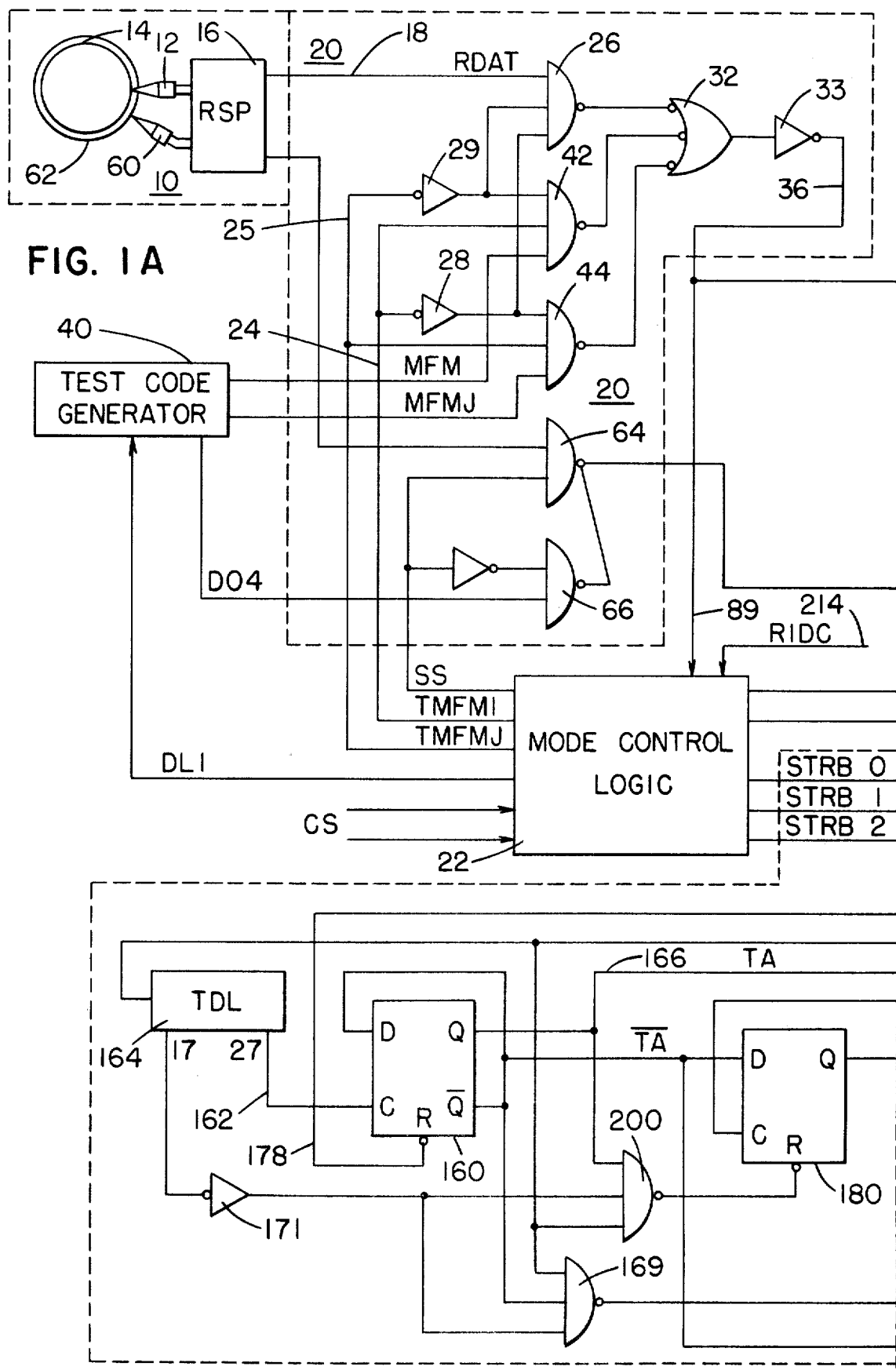
FIGS. 1A and 1B, when arranged side by side, form a logic diagram of data recovery circuits in a disk subsystem controller utilizing apparatus in accordance with the present invention.
Figure 1B:
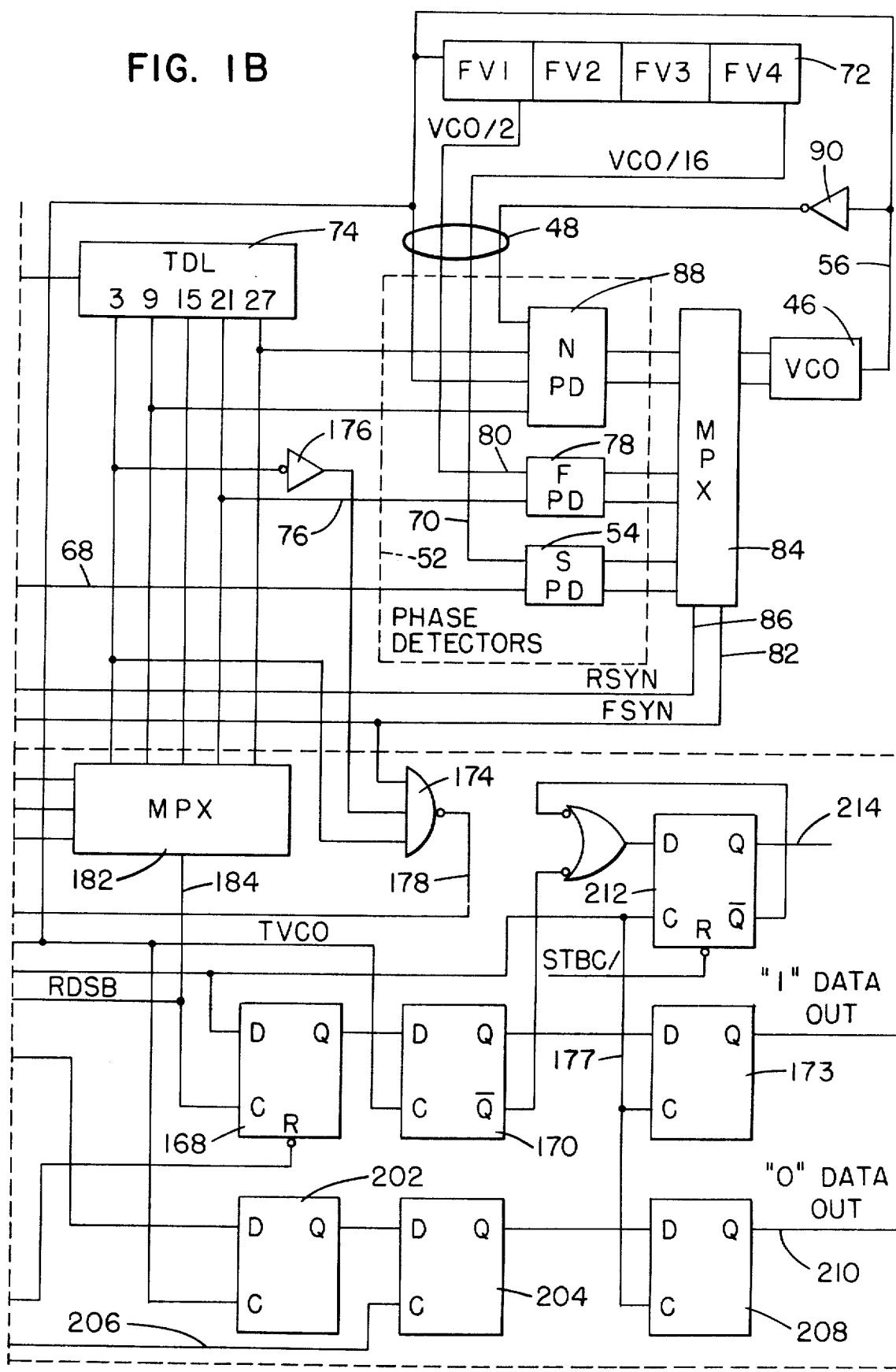
Figure 2:
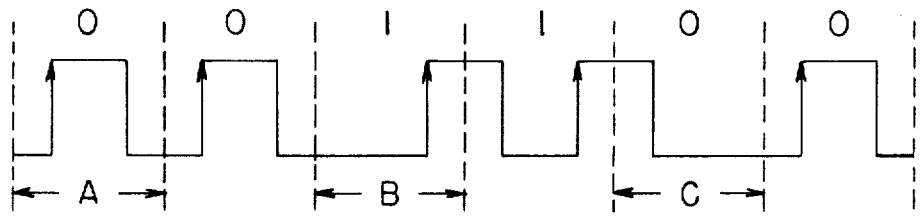
FIG. 2 is a waveform illustrating MFM encoding of data.

Referring now to the Figures by characters of reference, FIG. 1 shows digital data recovery circuits utilizing a preferred embodiment of the present invention. It is assumed that selfclocking data such as MFM encoded data is recovered from a direct access storage device 10 such as a magnetic disk unit. The digital data is represented by a series of flux transitions on a magnetic medium in motion with respect to an electromagnetic transducer 12. The transducer 12 senses the flux transitions on a data track 14 as occurring in relation to a series of time periods termed "cells" or "bit periods," each of which cells is divided into two equal time periods. MFM encoded data is defined herein as a representation of one binary digit ("1") by a flux transition occurring during the second half of a cell, and the other binary digit ("0") by a flux transition of the same direction occurring during the first half of a cell, except when the other bit ("0") follows the one bit ("1"), in which case the other bit ("0") is represented by the absence of a flux transition during the corresponding bit period. FIG. 2 shows an MFM encoded (voltage) waveform having the bit pattern 001100. Cell boundaries are represented by dashed lines. Cell A shows a positive excursion representative of a "0" flux transition occurring during the first half of the cell; cell B, a positive excursion during the second half of the cell representative of a "1" flux transition. Cell C represents a "0" bit following a "1" and therefore has no positive excursion during the bit period. The selection for illustration of both a positive excursion and a particular bit represented thereby is arbitrary.

The waveform of FIG. 2 is representative of MFM data detected by the transducer 12 from the data track 14, regenerated by a read signal processor (RSP) 16, and transferred as an RDAT signal to data selection circuits 20. The RSP 16 comprises pulse shapers and drivers which are well known in the art and do not form a part of my invention.

Mode control logic 22 in the storage controller generates test control signals TMFM1 and TMFMJ which are transferred to the data selection circuits 20, respectively, via lines 24 and 25. When both the TMFM1 and TMFMJ signals are disabled during normal data recovery operations, a NAND element 26 is enabled via inverters 28, 29 to transfer the RDAT signal supplied thereto as a third input via the line 18. The RDAT signal is transferred via a NAND element 32 and inverter 33 to the data recovery circuits via an input line 36. During selected time periods of normal operation when the data recovery circuits are dormant, i.e., not being utilized for a read operation with the storage device 10, the mode control generator 22 may enable the data selection circuits 20 to supply a data bit string from an alternate source for test purposes.

A test code generator 40 supplies data bit strings MFM and MFMJ for testing the data recovery circuits of the storage controller. The TMFM1 signal from mode control generator 22 enables the MFM signal bit string onto the input line 36 by enabling a NAND element 42; the TMFMJ signal enables the MFMJ bit string via a NAND element 44. When either of the test signals TMFM1 or TMFMJ are enabled the RDAT NAND element 26 is disabled by a signal from the corresponding inverter 28, 29. Similarly, the TMFM1 signal disables the MFMJ NAND element 44 via the inverter 28, and the TMFMJ signal disables the MFM NAND element 42 via the inverter 29. Thus, only one bit string may be gated through NAND element 32 at one time.

Data recorded on cyclic store devices such as the storage device 10 is arranged in groups of machine words called blocks. During the write operation, certain digits not used to represent data are generated by the store control unit and included in each block of data. These special digits, termed gap digits, are control items utilized for storage management and device control; the gap digits may take various formats depending on the particular type of device and the control means utilized for storing information on the device and retrieving it therefrom. A useful reference describing some gap formats and their use in a disk subsystem is, *Peripheral Devices*, by Ivan Flores, 1973, PrenticeHall, Inc., page 375 et seq.

The data recovery circuits of FIG. 1 comprise a voltagecontrolled oscillator (VCO) 46, feedback circuits 48, data separation circuits 50 and phase detector circuits 52. The VCO 46, feedback path 48, and a phase detector such as a servo phase detector (S PD) 54 form a phase-locked oscillator (PLO) which generates a timing signal TVCO on output line 56. The TVCO signal is phase-locked at a basic frequency of the storage and retrieval system by detecting any difference in phase which may exist between an input signal and the TVCO output signal, and adjusting the VCO 46 frequency accordingly. The phase-locked oscillator comprising the element 46, 52 of FIG. 1 is representative of a combination of commercially available modules, as for example, a Motorola MC4044 and 4024 phase-locked loop circuit. The basic frequency of the embodiment described herein is approximately 14.2 MHz.

The mode of operation of the data-recovery circuits is dependent on the type of input signal being sensed. Three modes of operation are extant in the data recovery circuits of FIG. 1: these are termed servo, fast lock and normal modes. Servo mode is enabled during a write operation in order to slave the timing of the data being written onto the data track 14 as closely as possible to the actual speed of the disk drive as reflected by the timing marks of a clock track 62. During a read operation the timing inherent in the data is extracted therefrom; consequently, at the beginning of a read operation the data recovery circuits are switched from servo mode to fast lock mode. During fast lock read, a PLO sync item is included with the gap digits of the records written on the data track 14. One example of such a sync item which may be detected during fast lock mode is a predetermined number of contiguous "0"s. Such a signal provides a single-phase signal at the basic frequency of the data which may be locked onto by the PLO more rapidly than the normal data signal which is multiphase. Other examples of PLO sync item formats are shown in the previously referenced title. After the predetermined number of PLO sync digits have been sensed, the PLO if operating properly will generate VCO clock signals on output line 56 at a basic frequency of the self-clocking data signals, and the mode of operation is switched from fast lock to normal mode for sensing the subsequent data signals.

A separate phase detector is associated with each of the three modes of operation. The servo phase detector 54 receives a servo signal from the RSP 16 via the data selection circuits 20. Servo timing marks are sensed by a magnetic transducer 60 from the clock track 62 of the storage unit 10. The servo signal in the presently described embodiment has a period of approximately 1.13 microseconds; it is transferred via a NAND element 64 of the data selection circuits 20 to the servo phase detector 54 under control of a servo select signal SS from the mode control logic 22. The SS signal is enabled whenever a device such as the device 10 is selected and is in the servo mode. When no device is selected, or during circuit test, the SS signal is disabled and a simulated servo signal D04 is transferred from the test code generator 40 via a NAND element 66 to an input line 68 of the servo phase detector 54. Another input line 70 of servo phase detector 54 receives a VCO/16 signal from a binary counter 72 in the feedback loop of the phase-locked oscillator.

Referring still to FIG. 1, the input data signal on line 36 traverses a tapped delay line 74. A plurality of output taps of the delay line 74 are labeled, respectively, 3, 9, 15, 21, and 27, to indicate a delay in nanoseconds for each tap. During fast lock mode, the input signal on line 36 is delayed twenty-one nanoseconds and applied to an input 76 of a fast-lock phase detector (F PD) 78. The increments of delay of the delay line 74 are arbitrary. Specific delays are chosen to optimize the position of the TVCO timing signal on line 56, positioning it accurately with respect to input data bit transitions. The binary counter 72 comprising bistables FV1-4 supplies a VCO/2 feedback signal from bistable FV1 to a second input 80 of the phase detector 78. Fast lock mode is enabled by a control signal FSYN transferred from the mode control logic 22 via a line 82 to a multiplexer 84. The multiplexer 84 is responsive to the enabled FSYN signal to transfer the output signals of the fast lock phase detector 78 to the input of the VCO 46. The multiplexer 84 is further responsive to a RSYN read-sync signal received from the mode control logic 22 via a line 86 to transfer the output signals of a normallock phase detector (N PD) 88 through the multiplexer 84 to the VCO 46. When neither the FSYN nor RSYN signal is enabled, the output of the servo phase detector 54 is enabled to the VCO 46. The mode control logic 22 receives control information from the gap digits of the input data string via a line 89 and control signals CS from an external source (not shown), e.g., a store subsystem microprocessor, a central system, or the like.

The normal-lock phase detector 88 receives the data input signal delayed via taps 9 and 27 of the delay line 74, the taps 9 and 27 forming a time window during which an MFM data transition may be expected to occur. The input signals from taps 9 and 27 are compared, respectively, with the TVCO timing signal from the VCO 46 and its complement generated by an inverter 90.

Figure 3:
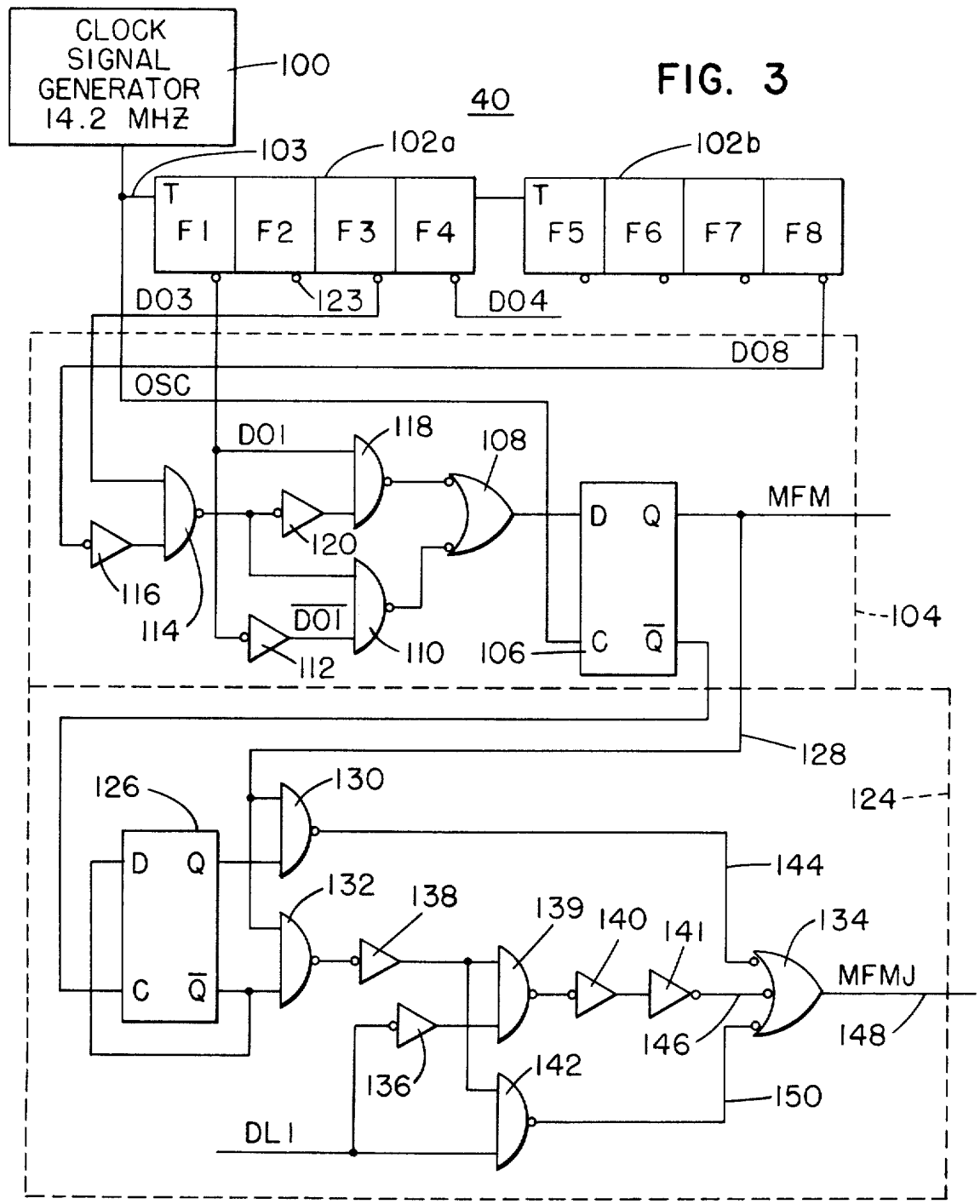
FIG. 3 is a logic diagram of a test code generator.

Referring now to FIG. 3, a schematic diagram of one embodiment of the test code generator 40 of FIG. 1 is shown. A freerunning clock signal generator 100 produces OSC clock signals from which all timing functions for the test code generator 40 are derived. The OSC signal is a symmetrical waveform having a period of 70.4 nanoseconds. A conventional binary counter 102 comprising bistables F1-F8 is shown in FIG. 3 as two modules 102a and 102b, each module having four bistables. The binary counter 102 receives the train of OSC pulses via a line 103 and in response thereto generates output signals D01-D08. Although an 8-bit binary counter is described, a counter having more stages may be utilized, as will be shown in the ensuing discussion. A longer MFM-coded bit-string may be desired than that which may be generated utilizing an 8-bit counter. The numeric designation of each of the binary counter output signals D01D08 conveniently denotes the relationship by power of 2 between the period of the input clock signal and the period of the respective output signal. For example, the period of the D03 signal is 70.4 nsec × $2^3$ = 563 nsec.

Figure 4:
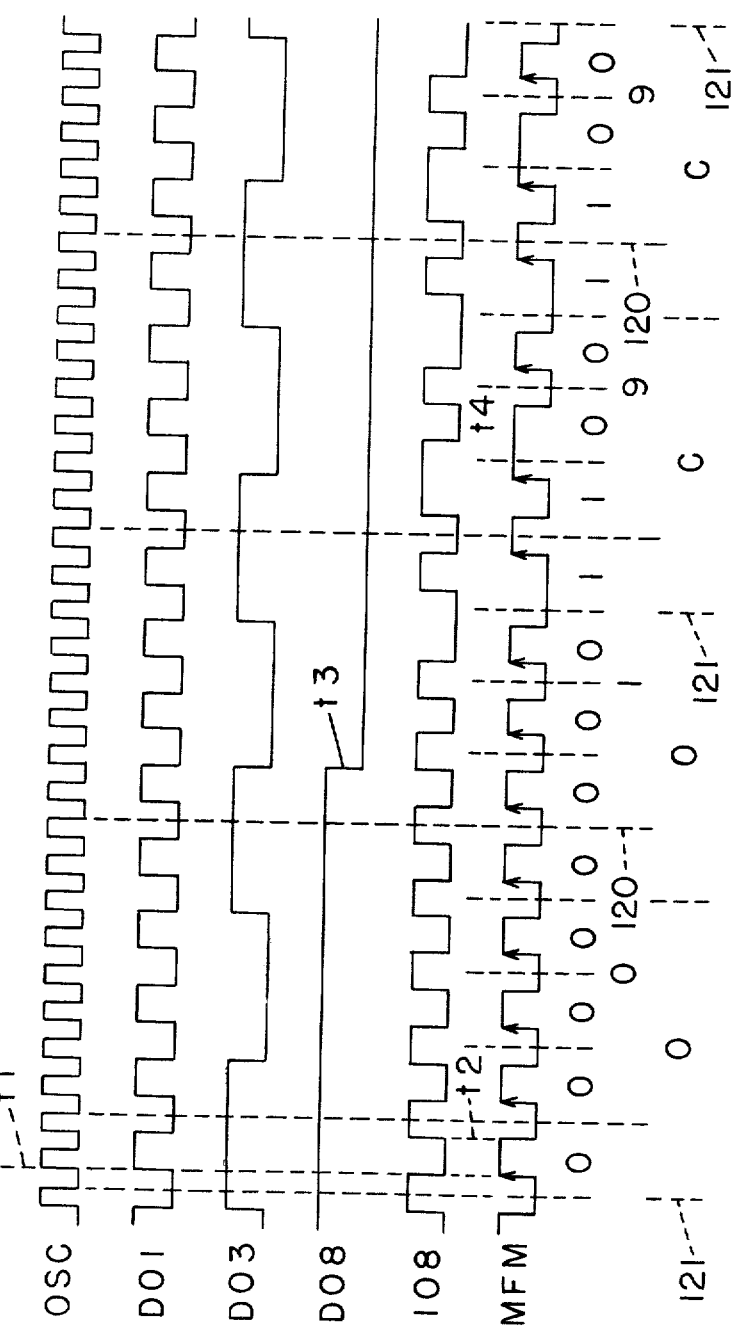
FIG. 4 is a timing diagram showing signal waveforms of the test code generator.

MFM encoding logic 104 receives inputs from the clock signal generator and the binary counter 102. Referring still to FIG. 3 in conjunction with the timing diagram FIG. 4, the OSC clock signal applied to the clock input C of an MFM bistable 106 switches the bistable 106 at time t1, when an enabling signal is applied to the D input terminal from a NAND element 108. The bistable 106 responds to a positive transition of the clock signal at the C input terminal to change the state of the Q and Q output terminals, if the signal at the D input terminal is the same state as the Q output terminal, a wellknown relationship for a D-type bistable. When the D08 signal is high the NAND element 108 follows the excursions of the D01 signal via a NAND element 110 and inverter 112. The NAND element 110 is enabled by the D08 signal via a NAND element 114 and inverter 116. Referring to FIG. 4, the MFM waveform generated at the Q output terminal of bistable 106 is shown in relation to data cell boundaries indicated by dashed lines each two periods of the OSC clock signal. The positive excursion of the MFM signal at t1, during the first half of the bit cell, is representative of a binary "0" as previously described with reference to FIG. 2. The MFM bistable is reset by the next OSC clock signal at time t2 when the D input is low. The MFM bistable continues to toggle thus each bit period, producing a series of binary "0"s until the D08 signal goes low at time t3. After time t3 the D input to MFM bistable 106 is controlled alternately by NAND elements 110 and 118 in response to the output signal of NAND element 114. When D03 is low, NAND element 110 is enabled by the high output of NAND element 114 and NAND element 108 continues to follow the excursions of D01. When the D03 signal is high, the low output of NAND element 114 enables NAND element 108 via NAND element 118 and inverter 120. NAND element 108 therefore follows the excursions of the D01 signal when D03 is high, and the MFM bistable 106 toggles positively during the second half of the bit cell. In accordance with the MFM encoding technique there is no positive excursion of the MFM signal during a "0" bit cell which follows a "1" bit cell, as for example at time $t4$, FIG. 4.

The MFM encoding logic 104 of the presently described embodiment produces a string of "0" bits for approximately 9 microseconds or 64 bit periods, while the D08 signal is high. When D08 signal is low, the MFM encoding logic generates a string of alternating pairs of "1"s and "0"s, again for 64 bit periods. Machine words commonly comprise groups of bits termed syllables or bytes, e.g., 8-bit bytes each having two hexidecimal coded binary characters. FIG. 4 illustrates by reference numerals 120 the selection of a byte boundry delineating such an organization for the MFM signal. Organized thusly, the output signal of the MFM encoding logic 140 generates a data string comprising seven bytes of hexidecimal zeros (designated herein $(00)_{16}$), followed by one byte of $(19)_{16}$ as shown in FIG. 4, and eitht bytes of data consisting of, $(99)_{16}$ . . . $(99)_{16}(80)_{16}$. This pattern is particularly useful because it simulates the format of a short machine record having gap digits comprising a PLO sync item followed by a sync byte and a data item. The $(19)_{16}$ byte represents the sync byte, and the subsequent $(99)_{16}$ . . . , represents the data. It should be noted for this organization that the string of zeros forming the PLO sync item may consist of eight bytes of $(00)_{16}$ less one "0" bit.

Another organization for the same data pattern is shown on FIG. 4 by byte boundries 121. In this organization the MFM encoding logic 104 generates eight $(00)_{16}$ bytes followed by eight $(CC)_{16}$ bytes. In view of the foregoing, it is evident that selection of a particular organization of a data string is arbitrary within the confines of the bit pattern generated by the encoding logic. With the teachings of the present invention in mind it is further evident that other bit patterns may be generated by altering the encoding logic to satisfy another configurations, as for example, the machine record configurations shown in the previously referenced title. A counter such as the counter 102 with one more stage F9 would provide a D09 signal for generating an encoded bit string having thirty two syllables or bytes instead of the sixteen byte signal described herein. Other outputs of the counter 102 may be utilized to provide alternate bit patterns of the MFM signal, e.g., the D02 signal from terminal 123 may be utilized to change the pattern from "1" to "0" or vice versa every bit cell instead of every other bit cell as with the D03 signal of the described embodiment.

The MFM signal may be selected as an "ideal" input data signal to the data recovery circuits as previously described with reference to FIG. 1. The predetermined quality of the MFM test signal, i.e., a signal free of peak shift, dropouts, and other degradations which might be introduced by a storage device providing a test signal, is advantageous in comparing signals of doubtful quality from a plurality of sources with a known standard. In order to test the data recovery circuits of the storage controller with a known signal having precisely predetermined degradations, the test code generator of FIG. 3 includes means for introducing a predetermined amount of jitter into the MFM signal to produce a worst-case data pattern.

Referring to FIG. 3, jitter logic 124 includes a bit-select bistable 126 having an input signal applied at the clock terminal C thereof from the Q output terminal of the MFM bistable 106. The MFM signal is applied via line 128 to one input terminal of each of two NAND elements 130, 132. When the Q output terminal of the bistable 126 is high, the corresponding MFM bit is gated through an output NAND element 134 via NAND element 130. When the Q output terminal of the bistable 126 is high and a DL1 signal applied to NAND element 139 via an inverter 136 is low, the corresponding MFM bit is gated through the output NAND element 134 via the NAND element 132 and intermediate logic elements 138–141. Two different paths 144, 146 are thus selected for regeneration of alternate bits of the MFM signal as an MFMJ signal on output line 148. One path 144 has only two gate delays; the other path 146, six gate delays. The difference in delay in the presently described embodiment is about 30 nanoseconds, which is greater than the skew which exists in the signals supplied by most storage devices. The MFMJ signal thus provides a predetermined worst-case data pattern for testing the data recovery circuits of the storage controller.

Figure 5:
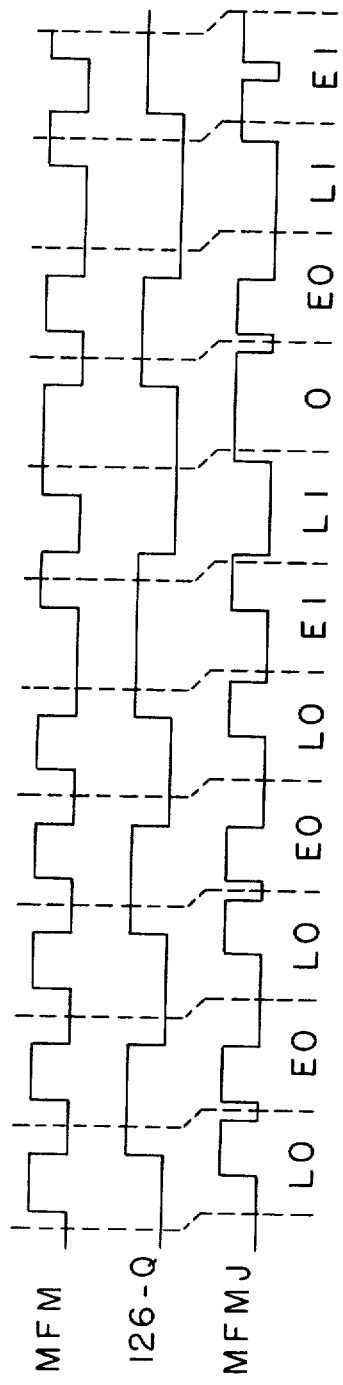
FIG. 5 is a diagram which shows the timing of the test data string.

Referring to FIG. 5, the MFMJ signal is shown in relation to the MFM signal and the Q output signal of the bit-select bistable 126. It is apparent that alternate bits are delayed via the path 146 (FIG. 3). An adjustment of the bit boundries (which are transparent to the hardware) shows in FIG. 5 that the MFMJ signal presents a bit string having a precisely predetermined skew between adjacent bits of the string. Each of the bits of the MFMJ signal (except the "absent" bit) is labeled with a prefix character L denoting late or E denoting early. It can be seen from FIG. 5 that the low to high transitions of the "0" bits of the MFMJ signal no longer occur at the center of the first half of each bit cell, but instead occur late and then early with respect to the center of the corresponding bit cell.

The DL1 signal generated by the mode control logic 22 (FIG. 1) provides a means for selecting another quantity of delay by routing alternate bits of the MFM signal via a path 150 having four gate delays; viz: logic elements 132, 138, 142 and 134.

Figure 6:
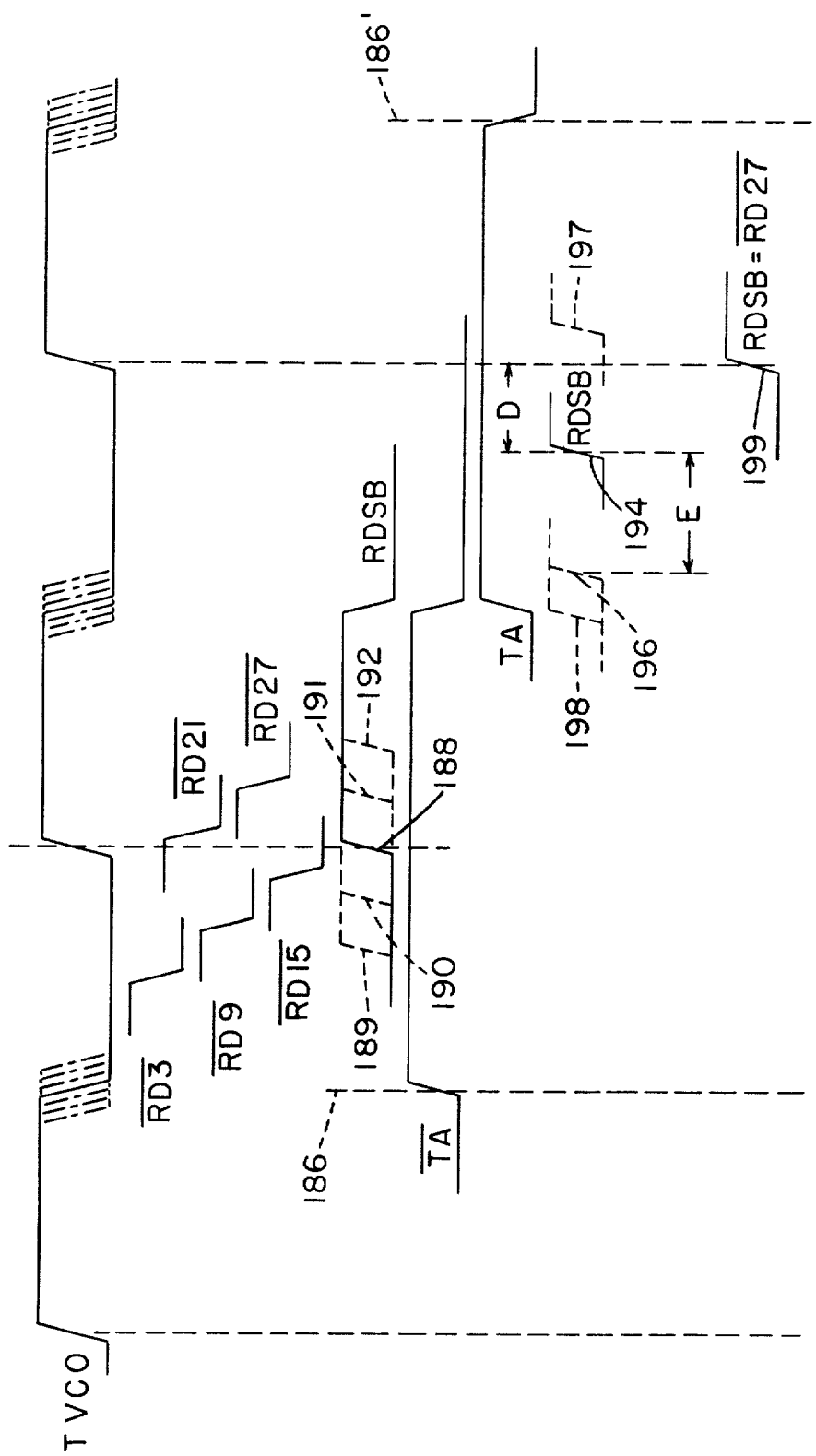
FIG. 6 is a timing diagram of the data detection circuits.

Returning now to FIG. 1 in conjunction with the FIG. 6 timing diagram, the data separation circuits 50 include a window signal bistable 160 receiving a clock signal input via a line 162 from a tapped delay line 164. The clock signal on line 162 is the TVCO timing signal delayed 27 nanoseconds. The delay is chosen to provide a TA signal at the Q output of the bistable 160, the center of which signal occurs at or near alternate positive excursions of the TVCO clock signal. The Q output of bistable 160 is high during the second half of a bit cell; the Q output is high during the first half of the same bit cell. The Q output of bistable 160 on line 166 thus provides a window or data framing signal TA occurring during that portion of a bit cell when a "1" signal transition may be expected to occur; the Q output, a data framing signal TA enabled during the "0" portion of a bit cell.

The TA signal is coupled to the D-input of a DATA1 bistable 168; the TA signal, to the D-input of a DATA0 bistable 180. The clock input terminal C of both bistables 168, 180 receives an input signal from a multiplexer circuit 182. The multiplexer 182 is a conventional-logic switching element having five input signals RD3, RD9, RD15, RD21, and RD27 corresponding, respectively, to the outputs 3, 9, 15, 21, 27 of the tapped delay line 74. One output signal RDSB is selectively generated on a line 184. The RDSB signal is the complement of one of the input signals RD3, RD9, RD15, RD21, and RD27, selectively regenerated under control of signals STRB0-2 from the mode control logic 22. When none of the STRB1-3 signals are enabled, the RD3 signal is regenerated as the RDSB signal. The STRB0 signal enabled selects the RD9 signal; the STRB1 signal gates the RD15 signal; and selection of both the STRB0 and 1 signals regenerates the RD21 signal. The STRB2 signal enables regeneration of the RD27 signal as the RDSB signal on the line 184. When the TA signal is enabled, the bistable 168 responds to a positive transition of the RDSB signal to enable the Q output thereof. The bistable 180 responds to a positive transition of the RDSB signal to enable the Q output thereof, when the TA signal is high. The bistables 168, 180 are reset by a positive transition of the RDSB signal occurring when the respective input singals TA, TA to the D terminals are low. The DATA1 bistable 168 thus "looks" for "1" bits, and the DATA0 bistable looks for "0" bits.

A signal for resetting the DATA1 bistable 168 is generated by a NAND element 169 just prior to the generation of the TA signal applied to the D-input via line 166. The TVCO clock signal at tap 17 of the delay line 164 enables the reset NAND element 169 via an inverter 171 prior to clocking the data framing bistable 160 with the same TVCO signal delayed to tap 27 and applied via line 162 to the C input of bistable 160. Similarly, the DATA "0" bistable 180 is reset via a NAND element 200. The reset function is provided for the DATA1 and DATA0 bistables 168, 180 to allow the detection of an absence of a data transition during any given bit period. Missing bits occur in certain data formats as a control item or flag, as for example, to indicate a partial-record syllable or byte.

The Q output of the DATA1 bistable 168 is clocked into a buffer bistable 170 on each succeeding positive transition of the TVCO clock signal, allowing the buffering of either early or late data bit transitions. The Q output of the bistable 170 is clocked into a bit-framing bistable 173 with each positive transition of the TA signal on a line 177. The Q output of the bistable 173 is coupled to external circuits (not shown) via a "1" DATA OUT line 172.

The Q output of the DATA0 bistable 180 is clocked into the first of a pair of "0" bit buffer bistables 202, 204 by a positive transition of the TVCO clock signal. The Q output of the bistable 202 is clocked into the buffer bistable 204 by the positive transition of the TA signal coupled via a line 206 to the C input of the bistable 204. Two buffer bistables 204, 206 are provided in the "0" bit detection logic to allow detection of a "0" bit following a "1" bit, which is represented by the absence of a data transition in the MFM code; and further to detect the absence of an edge or a missing "0" bit following a valid "0" bit in accordance with control item formats as previously described. The Q output of the bistable 204 is clocked into a "0" bit-framing bistable 208 with each positive transition of the TA signal on the line 177. The Q output of the bistable is also coupled to the external circuits via a "0" DATA OUT line 210.

A reset circuit comprising a NAND element 174 and an inverter 176 provides a signal via a line 178 for resetting the window signal bistable 160 during fast-lock mode. Resetting the bistable 160 via the line 178 insures proper phase relation between the input data signal and the servo signal. Otherwise stated, resetting the bistable 160 via the line 178 alternatively to the reset via the clock input line 162 insures that the initial string of "0" bits representative of a PLO sync item will be interpreted as "0"s instead of "1"s.

A sync-bit detection bistable 212 is reset by an STBC/signal coupled to the R input terminal thereof from the mode control logic 22 at the beginning of the string of "0" bits of the test data string simulating the PLO sync item. The bistable 212 remains reset until a "1" bit is detected and clocked simultaneously into the bistable 173, 212 by the rising edge of the TA signal. The Q output of the bistable 212 is coupled as an R1DC signal to the mode control logic 22 via a line 214. The R1DC signal serves as a flag indicating detection of the first "1" bit in the $(19)_{16}$ syllable representing a sync byte. The mode control logic 22 then enables the RSYN signal in response to the R1DC signal.

Referring to FIG. 6, a representative composite bit period is depicted as bounded by the dashed lines 186, 186'. The diagram is a composite because the signals for both "0" and "1" data transitions are shown in the same bit period, while actually only one data transition occurs in any one bit period. Further, various other signals which do not occur simultaneously in the same bit period are shown in FIG. 6 only for convenience of explanation. FIG. 6 shows an ideal data transition 188 for a "0" bit occurring as the RDSB signal derived from the RD15 input signal. A small gate delay (approximately 5 nsec. in the presently described embodiment) of the multiplexer 182 is depicted in FIG. 6. Each of the input signals RD3, RD9, RD15, RD21, and RD27 is shown in the position it would occur in relation to the TA signal for an ideal data signal, i.e., a data transition exhibiting no shift due either to gate delays in the data recovery circuits or to inherent peak shift. By selecting the RD3, RD9, RD21 or RD27 inputs instead of the RD15 input, it is shown in FIG. 6 that the ideal data transition may be made to occur, respectively, at other positions 189192. It is evident that a wide variation of random shift (both positive and negative) may be accommodated by the data recovery circuits, if the ideal signal occurs in the center of the TA data framing signal. Selection of the RD15 signal nominally positions the input data signals centrally bracketed by the framing signal. If the signal is offset either to the right or left of the center. position 188 due to accumulative gate delays inherent in the combination of modules forming the data recovery circuits, the ability of the data recovery circuits to accommodate large amounts of jitter in the input signal is impaired.

An example of a "1" bit input signal 194 having an inherent or fixed negative offset is shown in relation to the TA signal of the composite FIG. 6. The signal 194 exhibiting random shift or jitter may occur early or late as shown, respectively, by the dashedline signals 196, 197. In order to determine the approximate magnitude of the offset D, a test bit string such as the MFMJ signal having a predetermined amount of jitter, i.e., equal amounts of both positive and negative shift for alternate bits, is selected as the input to the PLO via the delay line 74 (FIG. 1B). An attempt is made to lock onto and read the test bit string, successively, at each of the settings of the multiplexer 182. The PLO should always be able to lock on the center tap signal RD15; but, as the selected signal moves further from center, a read error will eventually occur. For example, the RDSB signal 196 of FIG. 6 having negative jitter E coupled with the inherent circuit offset D would occur at position 198, when derived from the RD9 signal; a read error would result because the DATA1 bistable 168 would fall to set in response to the signal transition 198 which occurs just outside the TA signal data window. By comparing the results of the test bit string read with the various increments of delay successively selected via the multiplexer 182, the signal offset introduced by the interconnected modules of the data detection circuits is determined. For example in the presently described embodiment, read errors occurring with the selection of the RD9 signal indicate a negative offset of approximately two increments of delay. The normal input data subsequently read is repositioned centrally in the data window by selecting the RDSB output which removes the offset. For example, the signal 194 occurring with an offset D is read normally to remove the offset D by selecting the RD27 input to the multiplexer 182. The signal 194 is thereby positioned as indicated by the reference character 199 at the approximate center of the TA data framing signal; consequently, the ability of the data recovery circuits to accommodate a wide range of signal jitter is reestablished. The accuracy obtainable by this method is dependent on the magnitude and accuracy of the incremental delays of the tapped delay line 74. All other components in the data recovery circuits may have relatively wide variations and tolerance with respect to signal propagation time. The presently described embodiment utilizes a delay line having a delay of six nanoseconds between the taps; consequently, the ideal input signal is adjustable to within plus or minus six nanoseconds of the center of the window signal.

I have described herein a test code generator for providing a self-clocking data string to data separation circuits of a data retrieval system. The test data string may be an ideal signal having virtually no degradations like those generated by conventional storage devices. Alternatively, the test data string may provide a worst-case signal having a data pattern with precisely predetermined degradations in the form of skew or phase shift of the data bits. The manner in which the data separation circuits respond to the degraded test signal provides an exacting measure of the ability of the data separation circuits to function under predetermined, marginal conditions. In combination with the test code generator, apparatus in the data separation circuits provides means for dynamically detecting the offset inherent in the data separation circuits. The offset may then be corrected by positioning the input data transitions for an ideal signal near the center of the data window.

The test code generator allows "on line" testing of both the data separation circuits of the storage subsystem controller, and testing by comparision of individual storage devices, thus greatly reducing the requirement for preventive-maintenance testing performed by service personnel. Apparatus for comparing the predetermined test pattern with the pattern of recovered data is well known in the art and may comprise the central processing unit of a data processor, a microprogrammed controller or the like.

While the principles of my invention have now been made clear in the foregoing description, it will be immediately obvious to those skilled in the art that many modifications of structure, arrangement, proportions, the elements, material and components may be used in the practice of the invention which are particularly adapted for specific environments without departing from those principles. The appended claims are intended to cover and embrace any such modifications within the limits only of the true spirit and scope of my invention.

What is claimed is:

1. In a data retrieval system of the type recovering data stored as flux transitions on a magnetic-medium data source, the stored data having data signals and clock signals inherent therein, data recovery circuits comprising:
    means for generating a bit-string having a predetermined pattern representative of the stored data;
    means coupled to the bit-string generating means for detecting clock signals of an input bit-string;
    means responsive to the clock-signal detecting means for generating a framing signal;
    means receiving the framing signal and responsive thereto for detecting data signals of the input bit string; and
    means for coupling the bit-string generating means to the datasignal detecting means, the coupling means including means for selectively positioning the data signals with respect to the framing signal.

2. The data recovery circuits of claim 1, wherein the bitstring generating means includes means for generating the predetermined pattern as an ideal signal.

3. The data recovery circuits of claim 1, wherein the bit-string generating means include means for generating the predetermined pattern having successive signal portions with, alternatively, predetermined equal amounts of positive and negative offset with respect to an ideal signal.

4. The data recovery circuits of claim 1, wherein the coupling means includes delay means for coupling the bit-string generating means to the clock-signal detecting means.

5. The data recovery circuits of claim 4, wherein the delay means comprises a delay line receiving the bit string and having a plurality of output taps each presenting a regenerated representation of the bit string displaced in time by a different increment.

6. The data recovery circuits of claim 5, wherein the positioning means comprises means connected to the plurality of output taps for selectively coupling one of the displaced in time bit strings to the data-signal detecting means.

7. The data recovery circuits of claim 1, wherein the coupling means includes means for selectively substituting the bit-string generating means for the data source.

8. The data recovery circuits of claim 1, wherein the datasignal detecting means comprises first means for detecting "1" bits, and second means for detecting "0" bits, the first and second means each connected to the clock-signal detecting means.

9. In a data retrieval system of the type recovering data stored as flux transitions on a magnetic-medium data source, the stored data having data signals and clock signals inherent therein, data recovery circuits comprising:
    a test code generator;

delay means havng an input terminal receiving an input bit string and coupled to the test code generator, and a plurality of output terminals each regenerating the input bit string displaced in time by a different increment from the input bit string;

a phase-locked oscillator receiving the input bit-string and having an output signal comprising clock signals derived from the input bit-string;

means responsive to the output signal for generating a window signal;

logic means having an output-signal line and connected to the plurality of output terminals for selectively coupling one of the displaced-in-time bit strings to the output-signal line;

circuit means connected to the output signal line and responsive to the window signal and the clock signals for detecting data signals of the displaced-in-time bit string.

10. The data recovery circuits of claim 9, further comprising:

means intermediate the delay means and the test code generator for selecting an input bit-string from the test code generator or the data source.

11. In a data retrieval system of the type recovering data stored as flux transitions on a magnetic medium, the data having data signals and clock signals inherent therein; the data retrieval system having recovery circuits including phase-locked means for detecting the clock signals, means responsive to the detected clock signals for generating a framing signal, and means for nominally positioning the data signals centrally with respect to the framing signal, a method for dynamically detecting and correcting phase offset inherent in the recovery circuits, which offset displaces the nominally positioned data signals, the method comprising the steps of:

generating a bit-string having a predetermined pattern representative of the stored data;

selectively reading the bit-string substituted for the stored data;

incrementally displacing the nominally positioned data signals with respect to the framing signal until read errors occur; determining, from the read errors generated in the displacing steps, the amount of the offset inherent in the recovery circuits; and repositioning the data signals to occur centrally with respect to the framing signal to correct the offset inherent in the recovery circuits.

12. In a data retrieval system of the type recovering information stored as flux transitions on a magnetic medium, the combination comprising:

a source of said stored information;

first means coupled to said information source for generating a first sequence of signals having data signals and clock signals inherent therein, the first sequence of signals being representative of the stored data;

second means for generating a sequence of test signals representative of the first sequence of signals;

means for delaying an input sequence of signals;

means for selectively coupling said first and second signal generating means to said delaying means;

means coupled to said delaying means for detecting clock signals of the input sequence of signals;

means responsive to said clock signal detecting means for generating a framing signal;

means coupled to said delaying means and responsive to the framing signal for detecting data signals of the input sequence of signals; and means intermediate said delaying means and said data signal detecting means for selectively positioning the data signals with respect to the framing signal.

13. The combination comprising:

a source of information stored in the form of magnetic flux transitions having a data signal component and a synchronizing signal component;

means for reproducing said stored information in the form of a first sequence of signals;

means for generating a sequence of test signals representative of said first sequence of signals;

means for delaying an input signal sequence;

means for selectively coupling the input of said delay means to the outputs of said reproducing and said generating means;

first means coupled to said delay means for recovering the synchronizing signal component from the input signal sequence therefrom;

means responsive to the recovered synchronizing signal component for generating a control signal;

second means coupled to said delay means and responsive to the control signal for recovering the data signal component from said input signal sequence; and means intermediate said delay means and said second recovering means for positioning said input signal sequence with respect to said control signal.

* * * * *